(12) United States Patent
Coffman et al.

(10) Patent No.: US 7,069,220 B2
(45) Date of Patent: Jun. 27, 2006

(54) METHOD FOR DETERMINING AND MAINTAINING DIALOG FOCUS IN A CONVERSATIONAL SPEECH SYSTEM

(75) Inventors: Daniel M. Coffman, Bethel, CT (US); Popani Gopalakrishnan, Yorktown Heights, NY (US); Ganesh N. Ramaswamy, Ossining, NY (US); Jan Kleindienst, Kladno-Krochehlavy (CZ)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 09/374,374

(22) Filed: Aug. 13, 1999

(65) Prior Publication Data

US 2003/0014260 A1 Jan. 16, 2003

(51) Int. Cl.
*G10L 21/00* (2006.01)
(52) U.S. Cl. .................... 704/275; 704/270
(58) Field of Classification Search .............. 704/251, 704/270, 275, 257, 9
See application file for complete search history.

(56) References Cited

U.S. PATENT DOCUMENTS

| | | | | |
|---|---|---|---|---|
| 5,265,014 A | * | 11/1993 | Haddock et al. | 704/9 |
| 5,748,841 A | * | 5/1998 | Morin et al. | 704/257 |
| 5,748,974 A | * | 5/1998 | Johnson | 704/9 |
| 5,892,813 A | * | 4/1999 | Morin et al. | 379/88.01 |
| 5,897,618 A | | 4/1999 | Loats et al. | 704/275 |
| 6,125,347 A | * | 9/2000 | Cote et al. | 704/275 |
| 6,246,981 B1 | * | 6/2001 | Papineni et al. | 704/235 |

OTHER PUBLICATIONS

Papineni et al., "Free-Flow Dialog Management Using Forms," Eurospeech, Budapest, Hungary, Sep. 1999.
Lamel et al., "The LIMSI ARISE System for Train Travel Information," International Conference on Acoustics, Speech and Signal Processing, Phoenix, Arizona, Mar. 1999.
Ward et al., "Towards Speech Understanding Across Multiple Languages," International Conference on Spoken Language Processing, Sydney, Australia, Dec. 1998.

* cited by examiner

*Primary Examiner*—Angela Armstrong
(74) *Attorney, Agent, or Firm*—F. Chau & Associates, LLC

(57) ABSTRACT

A system and method of the present invention for determining and maintaining dialog focus in a conversational speech system includes presenting a command associated with an application to a dialog manager. The application associated with the command is unknown to the dialog manager at the time it is made. The dialog manager determines a current context of the command by reviewing a multi-modal history of events. At least one method is determined responsive to the command based on the current context. The at least one method is executed responsive to the command associated with the application.

25 Claims, 4 Drawing Sheets

METHOD FOR DETERMINING AND MAINTAINING DIALOG FOCUS IN A CONVERSATIONAL SPEECH SYSTEM

BACKGROUND OF THE INVENTION

1. Field of the Invention

The present invention relates to dialog systems, and more particularly to management of a dialog within a conversational computer system with multiple input modalities.

2. Description of the Related Art

Conversational systems typically focus on the interaction with a single application at a time. A speaker for a conversational system is only permitted to interact with the active application. This type of interaction is generally referred to as modal interaction or a modal system. That is, the user must specify which application he intends to use, and must finish working with that application before using another. This is disadvantageous in many situations where several applications may be needed or desired to be accessed simultaneously. Further, the conventional modal systems may result in loss of efficiency and time. In many instances, this leads to reduced profitability.

To illustrate a conventional modal system, a first task must be performed and closed prior to opening a second task and performing the second task. Conventional conversational modal systems are not capable of distinguishing tasks between applications. However, this is not how every day tasks are generally performed. In an office setting, for example, a worker might begin writing a letter, stop for a moment and place a telephone call, then finish the letter. The conventional modal systems do not provide this flexibility.

Therefore, a need exists for a system and method for determining dialog focus in a conversational speech system. A further need exists for a system which deduces the intent of a user to open a particular application.

SUMMARY OF THE INVENTION

A method of the present invention, which may be implemented with a program storage device readable by machine, tangibly embodying a program of instructions executable by the machine to perform method steps for determining and maintaining dialog focus in a conversational speech system, includes presenting a command associated with an application to a dialog manager. The application associated with the command is unknown to the dialog manager at the time it is made. The dialog manager determines a current context of the command by reviewing a multi-modal history of events. At least one method is determined responsive to the command based on the current context. The at least one method is executed responsive to the command associated with the application.

In other methods, which may be implemented using a program storage device, the step of presenting a command may include the step of employing at least one multi-modal device for presenting the command. The at least one multi-modal device for presenting the command may include a telephone, a computer, and/or a personal digital assistant (other devices may also be employed). The step of determining a current context of the command by reviewing a multi-modal history of events may include the step of providing a linked list of all events in the multi-modal history. The events in the multi-modal history may include at least one of events linked by time, by type, by transaction, by class and by dialog focus. The step of determining at least one method may include the step referencing all active applications using a component control to determine the at least one method which is appropriate based on the current context of the command. The command may be presented in a formal language such that a plurality of human utterances represent an action to be taken. The step of determining a current context of the command by reviewing a multi-modal history of events may include the step of maintaining a current dialog focus and a list of expected responses in the dialog manager to provide a reference for determining the current context. The step of querying a user for information needed to resolve the current context and/or information needed to take an appropriate action may also be included.

A system, in accordance with the invention, for determining and maintaining dialog focus in a conversational speech system includes a dialog manager adapted to receive commands from a user. The dialog manager maintains a current dialog focus and a list of expected responses for determining a current context of the commands received. A multi-modal history is coupled to the dialog manager for maintaining an event list of all events which affected a state of the system. The multi-modal history is adapted to provide input to the dialog manager for determining the current context of the commands received. A control component is adapted to select at least one method responsive to the commands received such that the system applies methods responsive to the commands for an appropriate application.

In alternate embodiments, the appropriate application may include an active application, an inactive application, an application with a graphical component and/or an application with other than a graphical component. The commands may be input to the dialog manager by a telephone, a computer, and/or a personal digital assistant. The multi-modal history may include a linked list of all events to associate a given command to the appropriate application. The events in the multi-modal history may include at least one of events linked by time, by type, by transaction, by class and by dialog focus. The control component preferably references all active applications to determine the at least one method which is appropriate based on the current context of the commands. The command is preferably presented in a formal language such that a plurality of human utterances represent an action to be taken.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
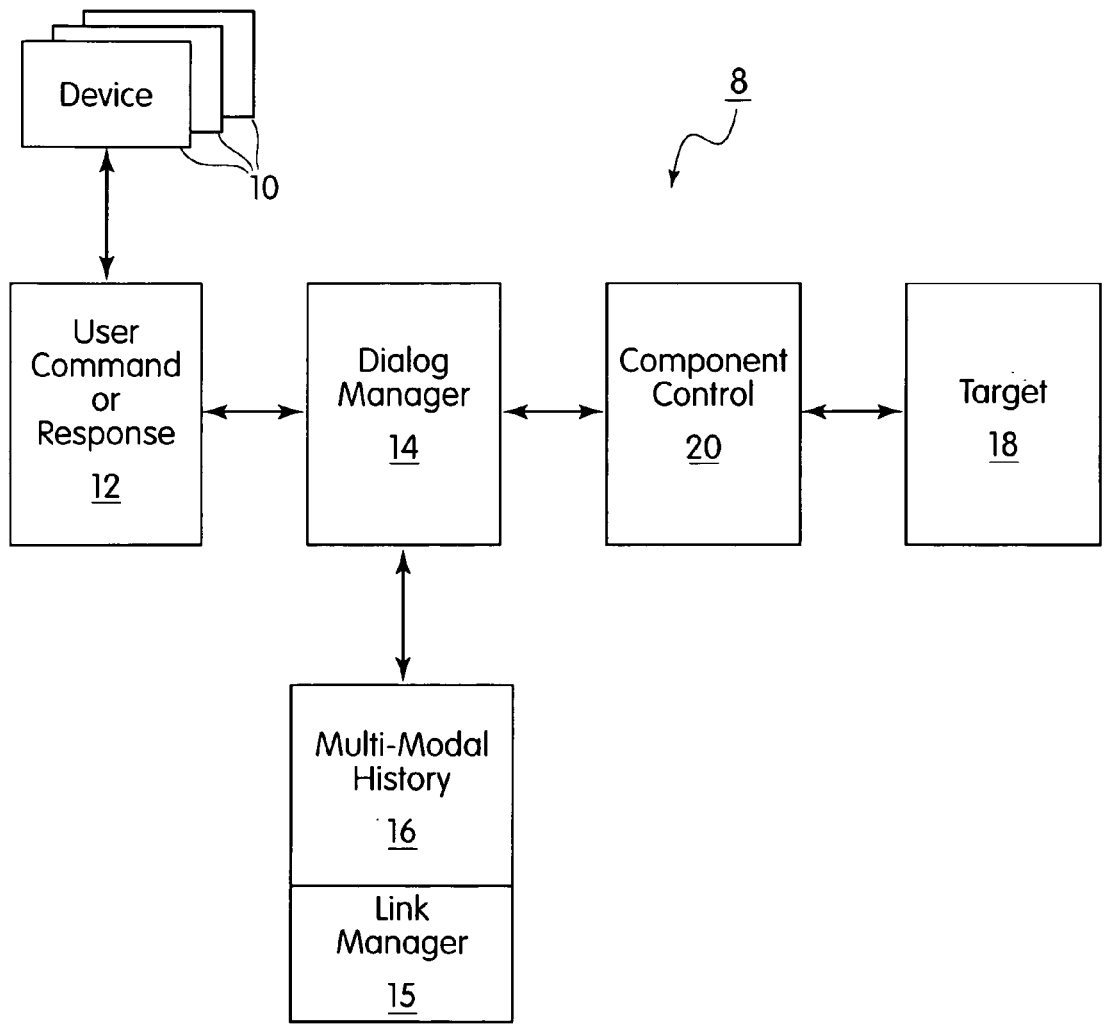
FIG. 1 is a schematic diagram of a conversational system in accordance with the present invention.

The present invention relates to the management of multiple applications and input modalities through a conversational system. The conversational system manipulates information from applications, presents this to a user, and converses with the user when some aspects of this manipulation are ambiguous. The present invention provides for many applications to be active at any time and for the system itself to deduce the intended object of a user's action. The invention provides a method for determining dialog focus in a conversational speech system with multiple modes of user input and multiple backend applications. The invention permits interaction with desktop applications which are not the subject of current graphical focus, or which do not even have a visual component. The methods provided by the invention achieve this focus resolution through an examination of the context of the user's command. The command may be entered through any one of the several input modalities, examples of which include a spoken input, a keyboard input, a mouse input, etc. A detailed history is maintained of the commands the user has previously performed. The final resolution proceeds through knowledge of any application specific aspects of the command, where the command is made from (i.e., from a telephone, computer, etc.) and an investigation of this history.

It should be understood that the elements shown in FIGS. 1–4 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow diagram is shown for a system/method for the implementation of dialog management for a multiple client conversational system 8 in accordance with the present invention. In block 10, various client devices such as a personal computer (PC), telephone, or personal digital assistant (PDA) (or other devices) may all be used as clients. The architecture by which this is accomplished is described in greater detail in commonly assigned U.S. application Ser. No. 09/374,026 entitled "METHOD AND SYSTEM FOR MULTI-CLIENT ACCESS TO A DIALOG SYSTEM," filed concurrently herewith and incorporated herein by reference. Each of these devices of block 10 has different input modalities. For example, the PC may have a keyboard, mouse, and microphone; the telephone may have a microphone and numeric keypad; the PDA may have a stylus. In block 12, any of these devices may be used to initiate a new command to the system 8 or to respond to a query from the system 8. The conversational system 8 further supports the use of any application the user desires. For example, an electronic mail (e-mail) application might be active simultaneously with a calendar application and a spreadsheet application. The application the user interacts with need not be explicitly selected. In the case of the PC, this application need not be in the foreground or graphical focus, or indeed even visible. In the case of most of the input modalities described above, the intended action is clear. If the user pushes a button on the PC with his mouse, for example, the user's intention is obvious because of the constraints placed on the user by the application's design. The button can only perform one action. Similar constraints apply for the PDA's stylus and the numeric keypad of the telephone. However, a spoken interface presents no such constraints.

In accordance with the invention, a user communicates with a spoken interface in much the same way the user would with a human. The user describes actions much more complex than those possible with an input device such as a mouse. The user also is able to speak in a natural manner with the system deciding what the user intends, carrying out this action, if possible, and prompting the user if more information is needed.

An intended target of a spoken command may not be at all obvious. In a system with several applications active simultaneously, each application may be capable of responding to the same spoken command. Thus, the target is determined dynamically, on an utterance-by-utterance basis. In a conversational system, the situation is even more complicated. The target may be one of the active applications if the utterance represents a command, but if it represents the response to a query from the system itself for more information, the target will be the pending action which generated the query. A concept related to, but distinct from, the target is that of dialog focus. This is the application with which the user is currently interacting. As such it represents the best hypothesis of the target of a command. When resolving the target of a command, the application with dialog focus is usually examined first to determine whether it can accept the command. This dialog focus may be implicitly or deliberately changed. If the user launches a new application, it will be granted dialog focus in the assumption that the user wishes to interact with the new application. The user may also request to bring a different application into the foreground and it will then be granted dialog focus.

A multi-modal system permits user input through a variety of modalities. In many cases, a spoken command will be superior, but there are certainly cases where, for example, a single mouse click may be more efficient or more to the user's liking. These non-speech inputs often change the context of the system, and the conversational system should be made aware of this. If, for example, the user starts a new application by using his mouse, the conversational system should know this to direct spoken commands to the new application. To this end, this invention presents a mechanism for capturing and maintaining a complete history of all events concerning the system 8, i.e., speech or non-speech events, the result of user input or of system output. A multi-modal history 16 is created in accordance with the invention. This multi-modal history 16 plays a role in deducing a target 18 of spoken commands.

FIG. 1 shows those components of the conversational system 8 used to determine the target 18 of a spoken command or response (block 12). This command or response 12 is presented to a dialog manager 14 for processing. In one embodiment, what is given to the dialog manager 14 is not the actual spoken command, but rather an element of a formal language representing the meaning of the command 12. In this manner, there may be many human utterances which convey the same meaning to the dialog manager 14. The actual form of this formal language may be "command(argument1=value1, . . . , argumentj=valuej)" where "command" represents the nature of the action to be taken or response, and "arguemt1=value1" represents a qualifier to this command. In this manner the utterance "Do I have anything scheduled for tomorrow?" would be transformed into the formal language "query_calendar (day=tommorow)". Alternately, the dialog manager 14 may be capable of handling direct human utterances, for example, by including a speech recognition system.

One purpose of the dialog manager 14 is to identify the intended target 18 of the command and a method for completing the command. The dialog manager 14 examines the formal language, extracts the command, and locates a corresponding method. In one embodiment of the present invention, these methods are implemented using independent decision networks, as described in commonly assigned U.S. application Ser. No. 09/374,744 entitled "METHOD AND SYSTEM FOR MODELESS OPERATION OF A MULTI-MODAL USER INTERFACE THROUGH IMPLEMENTATION OF INDEPENDENT DECISION NETWORKS," filed concurrently herewith and incorporated herein by reference. The determination of the correct target 18 proceeds through examination of the nature of the command and the current context of the system 8. This context may be obtained from the multi-modal history 16.

A component control 20 acts as a "switch yard". Component control 20 maintains a reference to all currently active applications. Component control 20 is described in greater detail in "METHOD AND SYSTEM FOR MULTI-CLIENT ACCESS TO A DIALOG SYSTEM," previously incorporated by reference. The target 18 determined by the dialog manager 14 is of an abstract nature. That is, the target 18 refers to a type of application, not its implementation. The dialog manager 14 may, for example, determine that the target 18 is a calendar component, but it has no knowledge of which particular application implements a calendar. This degree of abstraction permits a suite of applications currently active to be modified dynamically, at the user's discretion, with no modification to the dialog manager 14 needed.

Figure 2:
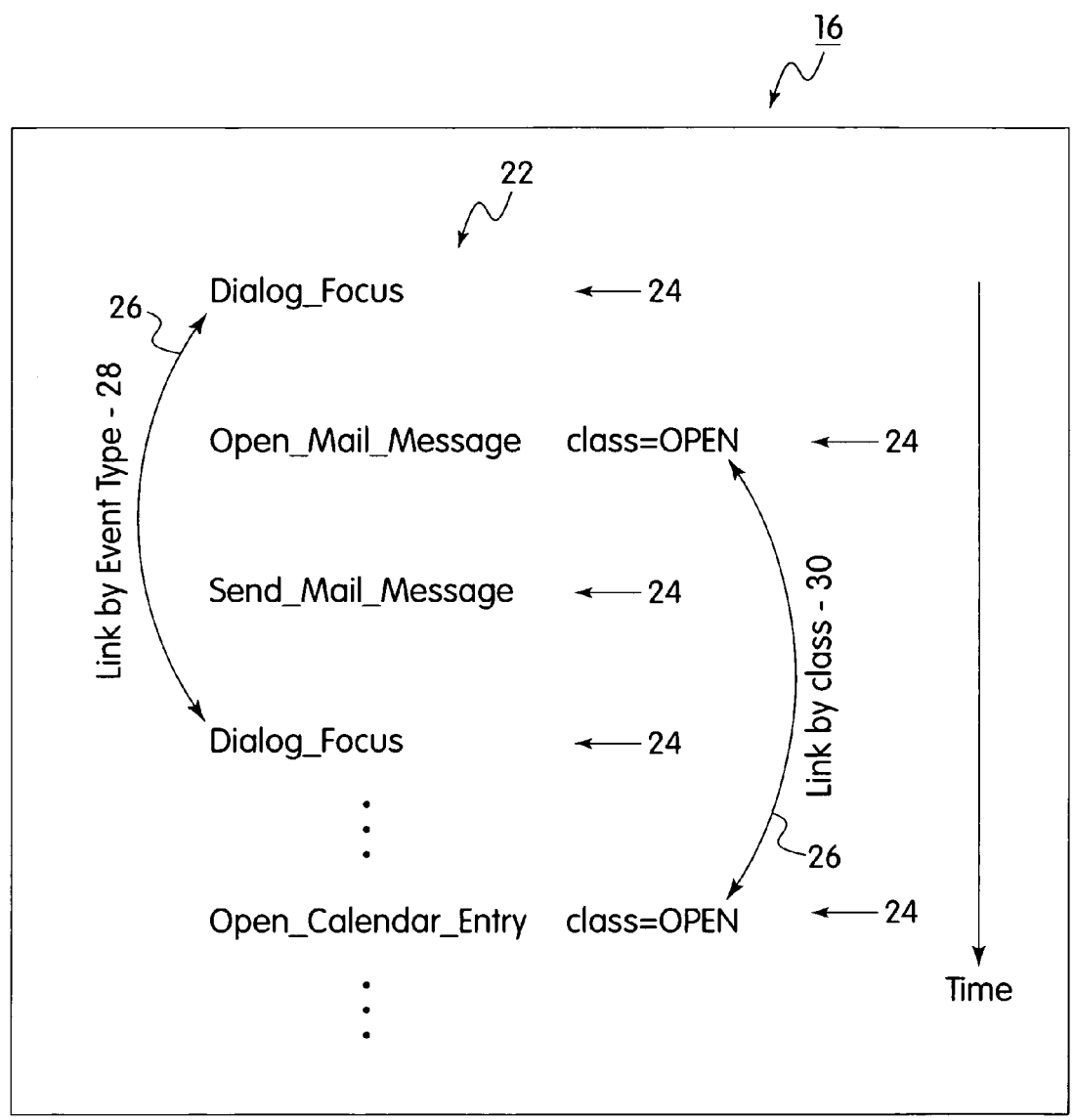
FIG. 2 illustratively depicts a multi-modal history in accordance with the present invention.

Referring to FIG. 2, the multi-modal history 16 is illustratively presented in greater detail. The multi-modal history 16 is a list of all events which have influenced the state of the system 8 as a whole, and the system's response to those events. The entries in the history 16 may be of several types. These may include user input of all types including both speech and non-speech inputs, responses from the system including results of queries, and prompts for more information, all changes of dialog focus and a descriptor of all successfully completed actions.

In the embodiment shown in FIG. 2, the multi-modal history 16 relies upon a linked list 22. All events 24 concerning the system 8 as a whole are maintained in the order received, but the history makes use of additional forward and backward links 26. In particular, the events 24 are linked by time, event type, transaction identifier, and event class. Among the event types included for this invention are "SET_DIALOG_FOCUS", "GUI_ACTION", and "COMPLETED_ACTION". The event type "SET_DIALOG_FOCUS" is an indication that dialog focus has been changed, either automatically by the system 8 or deliberately by the user. The event type "GUI_ACTION" indicates that the user has performed some action upon the graphical interface, and the nature of the action is maintained as part of the event. When an action is completed successfully, a "COMPLETED_ACTION" event is placed in the history. The event list 22 includes a complete history of all steps taken to complete the action, including any elements resolved in the course of the execution. Several steps may be taken during the completion of one action. All of the events generated as a result, share one unique transaction identifier. In the current embodiment, this transaction identifier is derived from the system clock time and date. As events within the history are linked also by this transaction identifier, all events pertaining to a particular action may be removed easily when they are no longer needed or relevant.

All events within the history 16 belong to one of several classes. Some examples are "OPEN", "DELETE", and "CHECK". An event belongs to the "OPEN" class when it describes the action of opening an object, such as, for example, a mail message, a calendar entry or an address book entry. All events 22 in the history 16 are also linked by an event type 28.

The numerous links within the history 16 permit efficient searches. If, for example, a request is made for an event of class "OPEN", a link manager 15 (FIG. 1) in the history 16 will return the most recent event of this type. If this is not the correct event, the previous link by class 30 of the event will provide a reference to the previous event of class "OPEN". These two events may have been widely separated in time. This process may be repeated until the correct event is located.

Figure 3:
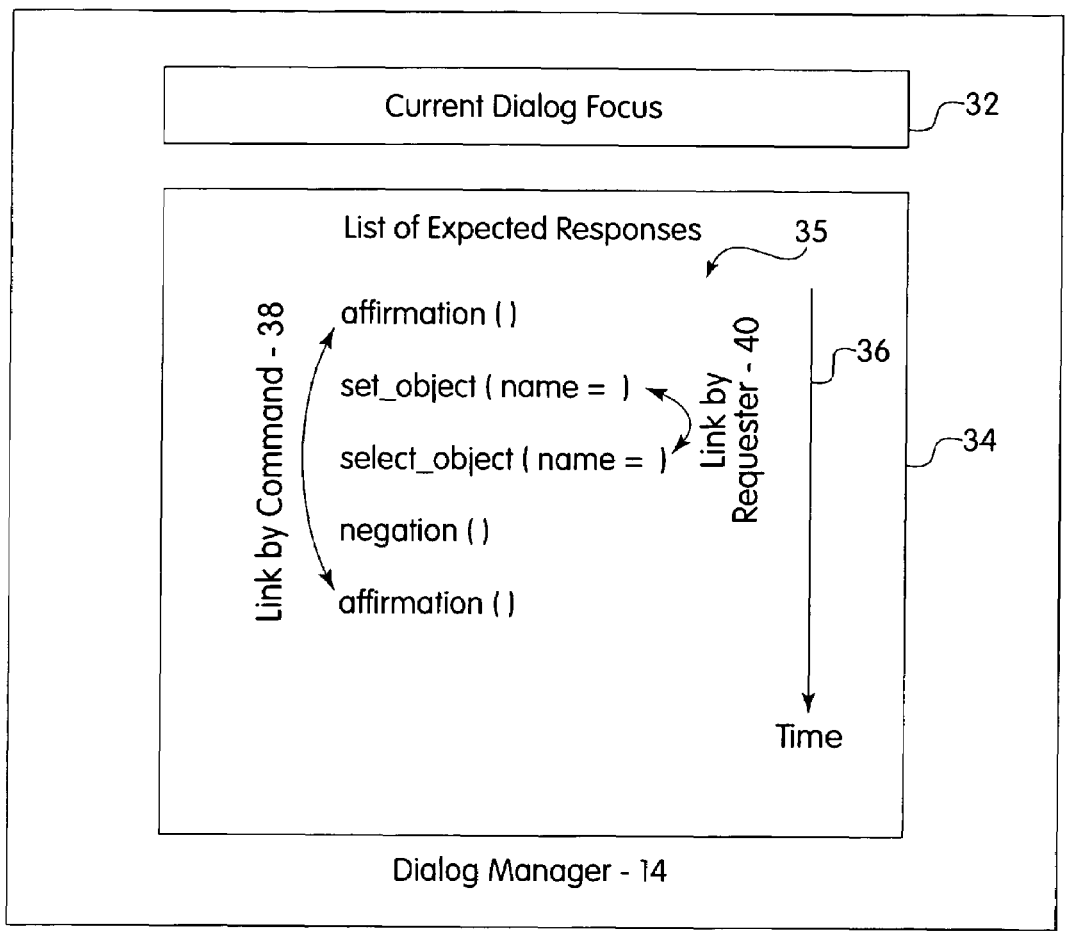
FIG. 3 illustratively depicts a dialog manager in accordance with the invention.

Referring to FIG. 3, the dialog manager 14 is shown in greater detail in accordance with the present invention. The dialog manager 14 maintains a reference to a current dialog focus 32. This is updated each time the dialog focus changes. The dialog manager 14 also maintains a list of expected responses 34. Each time the system 8 poses a question to the user, the method implementing the action being performed is permitted its expected response or responses with dialog manager 14. In the present implementation, this registration is performed by a decision network.

The list of expected responses 34 is implemented as a linked list 35, much like the multi-modal history 16. In this case, the elements are linked by time 36, command 38 and requester 40. The function of this list 35 is easily illustrated through an example. If a method executing a command poses the question "Do you mean Steve Krantz, or Steve Bradner?" to the user, the method expects a response of the form "I mean Steve Bradner" or simply "Steve Bradner". The formal language translation of the first response is "select_object (name=Steve Bradner)" and of the latter response "set_object (name=Steve Bradner)". The method will register the two possible responses with the dialog manager 14 with the commands being "select_object" and "set_object". In addition, each entry will include a field indicating the acceptable argument type is name. The process of resolution of the target 18 of a command makes use of these various components in several ways. First each time a formal language statement is presented to the dialog manager 14, the dialog manager 14 extracts the command portion and examines the list of expected responses 34 to discover if any pending action can make use of the command. If so, the dialog manager 14 also examines the acceptable arguments. In the previous example, the formal language statement "select_object (name=Steve Bradner)" would be found to match one of the expected responses whereas "select_object (object=next)" would not. If a matching expected response is found, the target 18 is taken to be the requester and the formal language statement forwarded to the requester. Subsequently, all expected responses from this requester are purged from the list of expected responses 34. If more than one requester has registered the same expected response, the dialog manager 14 decides which of these is correct. In the present implementation, the dialog manager 14 merely uses the most recent requester, however, in a different implementation, the dialog manager 14 could pose a query to the user for clarification.

If no expected responses match the formal language statement, the several components are used in various ways to resolve the intended target 18 depending on the nature of the command. In certain cases, the target is clear from the command itself. If the user were to ask "Do I have anything scheduled for next Monday?" the intended target is clearly a calendar component and no further resolution is necessary. Often the current dialog focus maintained within the dialog manager is the intended target. If the user says "Change the subject to 'proposal,'" the user is clearly referring to the application with dialog focus. In such cases, the target 18 is taken to be the current dialog focus 32, and the formal language statement is dispatched accordingly.

Certain commands are extremely ambiguous and are permitted in a conversational system to substantially enhance the quality of the interaction. The user can say, for example, "Close that" and the system must react correctly. However, such an utterance includes no information at all about the intended target. This target is resolved by examining the multi-modal history 16. In this particular example, the most recent event of type "COMPLETED_ACTION" and class "OPEN" would be fetched from the history 16. Such an event includes the target 18 of the original command. The target of the new command is taken to be the same as that of the original command and is forwarded to the original target. Hence, if the user says "Close that" the object most recently opened will be closed, be it a calendar entry, spreadsheet cell or other type of object. A further use of the history 16 is made when utterances such as "Undo that" or "Do that again" are received. The most recent event of type "COMPLETED_ACTION" is retrieved from the multi-modal history. Additional fields of such events indicate whether the action can be undone or repeated. The original command is extracted from the "COMPLETED_ACTION" event, and if possible as indicated by these fields, and undone or repeated as appropriate.

A special case is that of canceling an already proceeding action. In this case, the target of the formal language is the method performing this action itself. The most recent event of type "DIALOG_FOCUS," with the owner of the focus being a method, is fetched from the multi-modal history. The formal language is delivered to the method which will then cease executing its action. Subsequently, all events in the multi-modal history 16 bearing the transaction identifier of this now canceled method are purged from the history 16.

Figure 4:
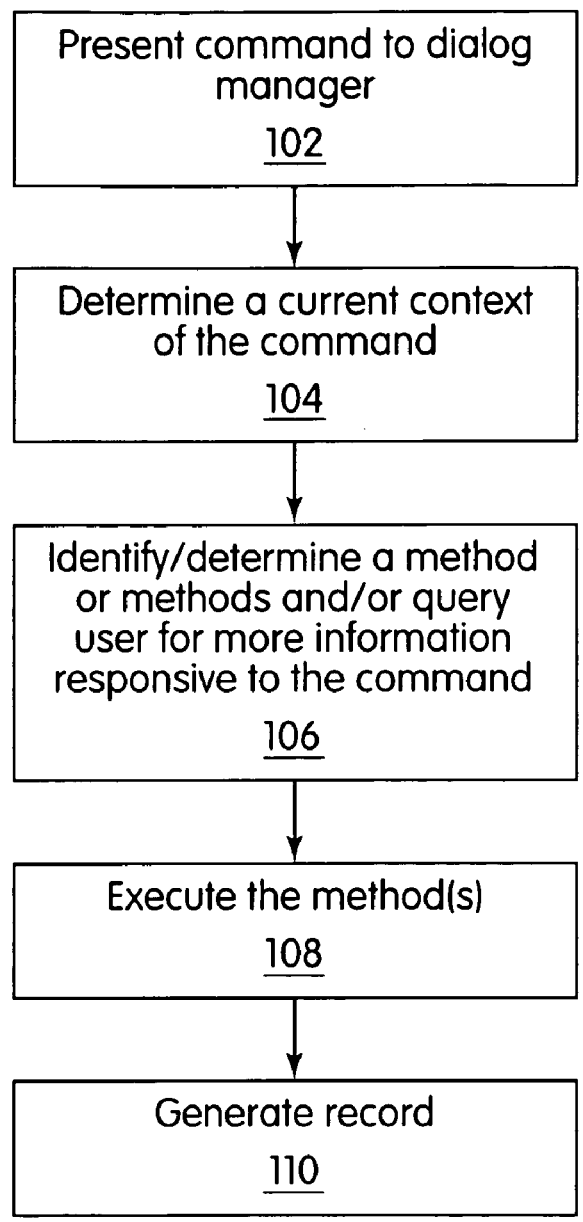
FIG. 4 is a block/flow diagram of a system/method for determining and maintaining dialog focus in a conversational speech system in accordance with the present invention.

Referring to FIG. 4, a block/flow diagram is shown, which may be implemented with a program storage device, for determining and maintaining dialog focus in a conversational speech system. In block 102, a command associated with an application to is presented to a dialog manager. The command may be in a formal language or be a direct utterance. The command or response may be input to the dialog manager from a user from any of a plurality of multi-mode devices. For example, a computer, a personal digital assistant, a telephone, etc. The application associated with the command is unknown to the dialog manager at the time the command is made, and therefore, the application which the command is intended for should first be deduced. In block 104, the dialog manager determines a current context of the command by reviewing a multi-modal history of events. The current context of the command is ascertained by reviewing a multi-modal history of events which preferably includes a linked list of all events in the multi-modal history. The events in the multi-modal history may include at least one of events linked by time, by type, by transaction, by class and by dialog focus. A current context of the command is determined by reviewing the multi-modal history of events, a current dialog focus maintained in the dialog manager and a list of expected responses also maintained in the dialog manager to provide a reference for determining the current context.

In block 106, at least one method is determined responsive to the command based on the current context. The method is determined based on the all active applications referenced using a component control to determine the method(s) which are appropriate based on the current context of the command. If a method cannot be determined or more information is needed, a query is sent to the user for information needed to resolve the current context or information needed to take an appropriate action. In block 108, the method(s) are executed responsive to the command or response to the query associated with the application. This means the present invention automatically associates the command given to an application which is active or inactive depending on the context of the command or response. In block 110, a record is maintained in the dialog manager and in the multi-modal history of any changes to states which the system has undergone. Records which are no longer relevant may be removed.

This invention illustratively presents a method and system for determining and maintaining dialog focus in a conversational speech system with multiple modes of user input and multiple backend applications. The focus resolution is achieved through an examination of the context of the user's command. The command may be entered through any one of the several input modalities. A detailed history is maintained of the commands the user has previously performed. The final resolution proceeds through knowledge of any application specific aspects of the command and an investigation of this history. This invention thus allows interaction with desktop or other applications which are not the subject of current graphical focus, or which do not even have a visual component.

Having described preferred embodiments of a system and method for determining and maintaining dialog focus in a conversational speech system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for determining and maintaining dialog focus in a conversational speech system comprising the steps of:
   maintaining a multi-modal history of events that result from user interaction with one or more user applications of a multi-modal computing system, wherein the events are maintained in chronological order, and wherein the events are linked by event type, wherein an event type includes a change of dialog focus;
   receiving and processing a user speech command directed to one of a plurality of the user applications of the multi-modal computing system;
   a dialog manager determining a target of the speech command by determining a current context of the speech command by reviewing the multi-modal history of events;
   determining at least one method responsive to the command based on the determined current context; and
   executing the at least one method responsive to the command.

2. The method as recited in claim 1, wherein the dialog manager determines a target application type from the current context which is responsive to the command, wherein the target application type is abstracted from the user applications supported by the multi-modal system.

3. The method as recited in claim 1, comprising receiving input commands from a user interacting with the multi-modal system using a plurality of modalities including a telephone, a computer, and a personal digital assistant.

4. The method as recited in claim 1, wherein the step of determining a current context of the command by reviewing a multi-modal history of events includes searching the multi-modal history of events by traversing linked events.

5. The method as recited in claim 1, wherein the events in the multi-modal history of events are linked by time, transaction and class.

6. The method as recited in claim 1, wherein the step of determining at least one method includes the step of referencing the user applications of the multi-modal computing system using a component control to determine the at least one method of a user application which is appropriate based on the current context of the speech command.

7. The method as recited in claim 1, wherein the speech command is presented in a formal language such that a plurality of human utterances represent an action to be taken.

8. The method as recited in claim 1, wherein the step of determining a current context of the command by reviewing a multi-modal history of events includes the dialog manager maintaining a current dialog focus and a list of expected responses, which is used by the dialog manager to provide a reference for determining the current context.

9. The method as recited in claim 1, further comprising the step of querying a user for one of information needed to resolve the current context and information needed to take an appropriate action.

10. A program storage device readable by machine, tangibly embodying a program of instructions executable by the machine to perform method steps for determining and maintaining dialog focus in a conversational speech system, the method steps comprising:
   maintaining a multi-modal history of events that result from user interaction with one or more user applications of a multi-modal computing system, wherein the events are maintained in chronological order, and wherein the events are linked by event type, wherein an event type includes a change of dialog focus;
   receiving and processing a user speech command directed to one of a plurality of the user applications of the multi-modal computing system;
   a dialog manager determining a target of the speech command by determining a current context of the speech command by reviewing the multi-modal history of events;
   determining at least one method responsive to the command based on the determined current context; and
   executing the at least one method responsive to the command.

11. The program storage device as recited in claim 10, wherein the dialog manager determines a target application type from the current context which is responsive to the command, wherein the target application type is abstracted from the user applications supported by the multi-modal system.

12. The program storage device as recited in claim 10, comprising instructions for receiving input commands from a user interacting with the multi-modal system using a plurality of modalities including a telephone, a computer, and a personal digital assistant.

13. The program storage device as recited in claim 10, wherein the instructions for determining a current context of the command by reviewing a multi-modal history of events includes instructions for searching the multi-modal history of events by traversing linked events.

14. The program storage device as recited in claim 10, wherein the events in the multi-modal history of events are linked by time, transaction and class.

15. The program storage device as recited in claim 10, wherein the instructions for determining at least one method includes the step of referencing the user applications of the multi-modal computing system using a component control to determine the at least one method of a user application which is appropriate based on the current context of the speech command.

16. The program storage device as recited in claim 10, wherein the speech command is presented in a formal language such that a plurality of human utterances represent an action to be taken.

17. The program storage device as recited in claim 10, wherein the instructions for determining a current context of the command by reviewing a multi-modal history of events includes instructions for the dialog manager maintaining a current dialog focus and a list of expected responses, which is used by the dialog manager to provide a reference for determining the current context.

18. The program storage device as recited in claim 10, further comprising instructions for querying a user for one of information needed to resolve the current context and information needed to take an appropriate action.

19. A multi-modal computing system comprising:
   a multi-modal history of events to maintain meta information of events that result from user interaction with one or more user applications of the multi-modal computing system, wherein the events are maintained in chronological order, and wherein the events are linked by event type, wherein an event type includes a change of dialog focus;
   a dialog manager that maintains a current dialog focus for one of a plurality of user applications and a list of expected responses, wherein the dialog manager determines a target of a speech input event by determining a current context of the speech input event using the multi-modal history of events or the list of expected responses; and
   a control component adapted to select at least one method responsive to the speech input event based on the target of the speech input event as determined by the dialog manager.

20. The system as recited in claim 19, wherein the control component selects a method associated with an active user application, an inactive application, an application with a graphical component and an application with other than a graphical component.

21. The system as recited in claim 19, wherein the multi-modal history of events maintains meta information of input events including speech and non-speech input events and output events generated by the multi-modal system.

22. The system as recited in claim 19, wherein the dialog manager determines a current context of the input speech event by traversing linked events in the multi-modal history of events.

23. The system as recited in claim 19, wherein events in the multi-modal history of events are further linked by time, transaction and class.

24. The system as recited in claim 19, wherein the control component references the user applications to determine the at least one method which is appropriate based on the current context of an input speech command.

25. The system as recited in claim 19, wherein an input speech event is presented to the dialog manager in a formal language such that a plurality of human utterances represent an action to be taken.

* * * * *